Jan. 11, 1949.  C. D. PETERSON ET AL  2,459,092
SLIP CLUTCH POWER TAKE-OFF UNIT
Filed April 19, 1945  2 Sheets-Sheet 1

INVENTORS.
CARL D. PETERSON
BY ALBERT H. DEIMEL
CARL H. WOLCOTT
Bodell & Thompson
ATTORNEYS Jan. 11, 1949.   C. D. PETERSON ET AL   2,459,092
SLIP CLUTCH POWER TAKE-OFF UNIT Filed April 19, 1945                              2 Sheets-Sheet 2

INVENTORS
CARL D. PETERSON
ALBERT H. DEIMEL
BY CARL H. WOLCOTT

Bodell & Thompson
ATTORNEYS

Patented Jan. 11, 1949

2,459,092

UNITED STATES PATENT OFFICE 2,459,092

SLIP CLUTCH POWER TAKE-OFF UNIT

Carl D. Peterson, Albert H. Deimel, and Carl H. Wolcott, Toledo, Ohio, assignors to Dana Corporation, Toledo, Ohio, a corporation of Virginia Application April 19, 1945, Serial No. 589,138

2 Claims. (Cl. 74—15.86)

1

This invention relates to power take offs for transmission mechanisms; and has for its object a power take off which is particularly compact and strong in construction and readily applied to the gear box of a transmission mechanism and which embodies a compact overload release coupling requiring minimum of essential space in an axial direction of the transmission.

A power take off embodying this clutch is particularly applicable for use in connection with a hydraulic torque converter transmission where the torque multiplication is high, as for instance, a transmission mechanism of the type shown in Peterson and Deimel Patent No. 2,369,369 issued February 13, 1945.

The invention consists in the novel features and in the combinations and constructions hereinafter set forth and claimed.

In describing this invention, reference is had to the accompanying drawings in which like characters designate corresponding parts in all the views.

Figure 1:
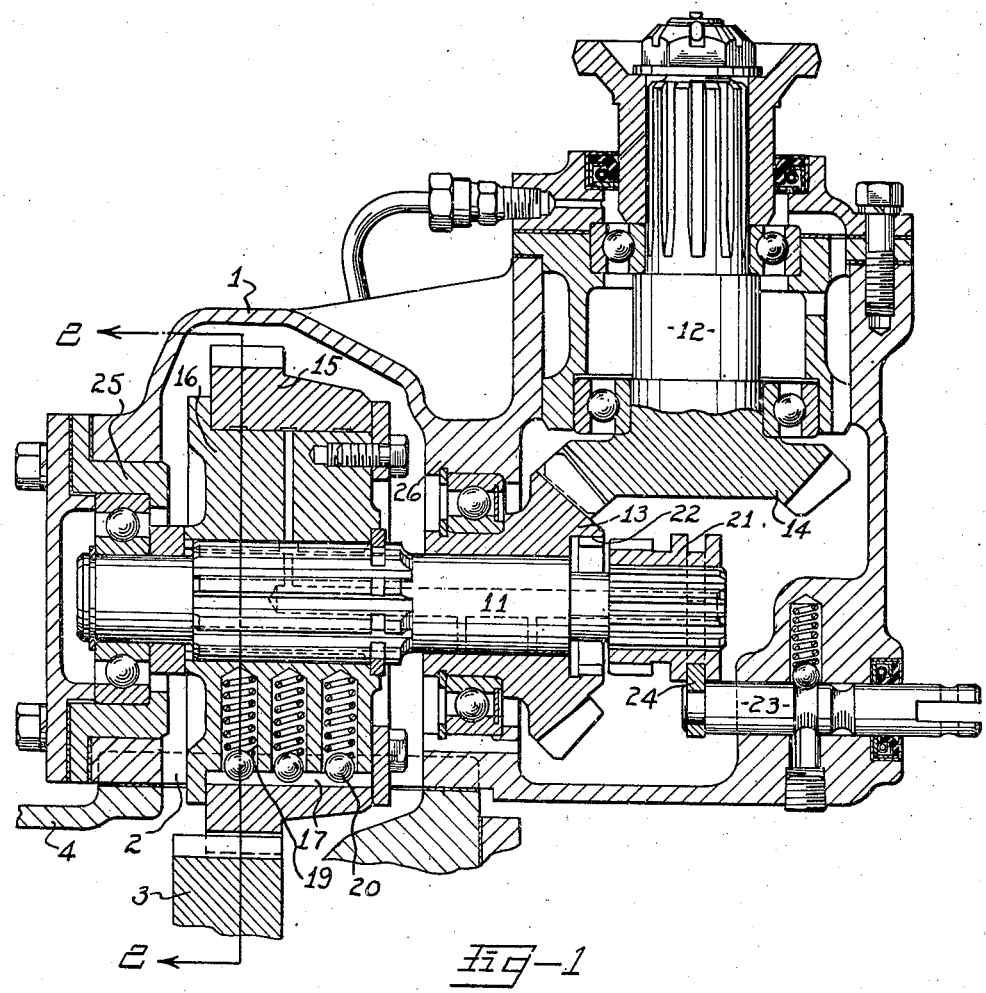
Figure 1 is a longitudinal sectional view through the power take off, the contiguous portion of the casing and a gear on the output shaft of the transmission mechanism being also shown.
Figure 2:
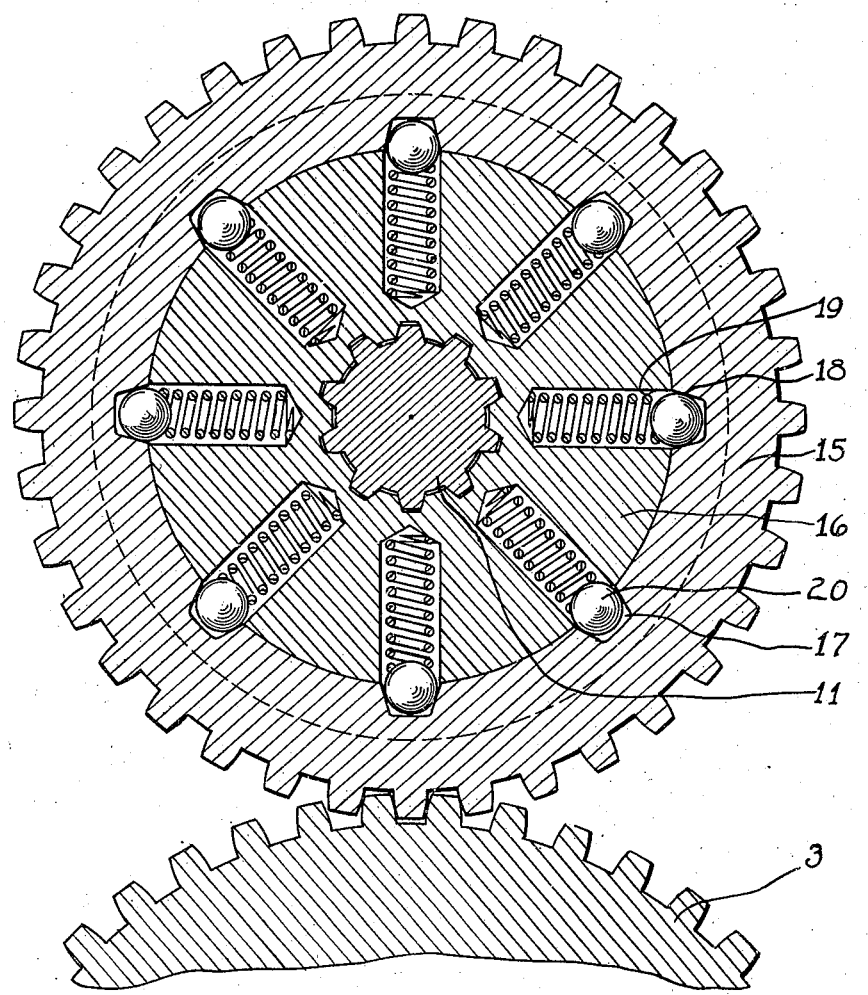
Figure 2 is an enlarged sectional view taken on the plane of line 2—2, Figure 1, through the overload release coupling.

This power take off unit includes, generally, a casing or box, having drive and driven shafts therein, which are usually arranged at an angle to each other, a drive gear for meshing with a gear on the output shaft of the transmission mechanism, an overload release coupling between the drive shaft and said gear and a manually operable clutch for clutching the drive and driven shafts together at will.

1 designates the casing or box which may be of any suitable construction, it being preferably made of one piece with the exception of openings for the bearings for the shafts therein and an opening, as 2, for registering with an opening in the gear box of the transmission mechanism, to which the unit is applied, in order that the drive gear of the power take off unit may coact with a gear, as 3, on the output shaft of the transmission mechanism.

4 designates the casing or box of the transmission mechanism to which the unit is applied.

11 and 12 designate respectively the driving and driven shafts of the unit, these being arranged at an angle to each other and journalled in bearings in the casing 1. The shafts 11 and 12 are provided respectively with intermeshing

2 bevel gears 13 and 14, the gear 13 on the drive shaft 11 being rotatably mounted thereon and clutchable thereto. 15 designates the drive gear of the unit, this being mounted concentric with the drive shaft 11 and connected thereto through an overload release coupling. As here shown, it is a slip rim on a hub 16 splined on the drive shaft 11, the gear extending through the opening 2 into the gear box for the transmission mechanism for meshing with a gear as 3 on the output shaft of the transmission mechanism. The gear 13 is connected to the hub 16 to slip under a predetermined overload, and as here shown the bore of the gear 15 is formed with internal transverse grooves or notches 17 having inclined or cam-shaped sides 18, and the hub 16 is formed with a series of equally spaced radial bores 19 in which spring loaded poppets as balls 20 are located, the balls normally seating in grooves 17. The springs are selected or loaded to apply a predetermined resistance and to compress under the camming force of the sides 18 of the grooves 17. Obviously, when the load becomes greater relatively to the driving torque, the slip rim gear 15 will slip, until the driving and load forces are again equal.

The gear 13 is clutched to the drive shaft 2 by a shiftable toothed clutch collar 21 splined on the inner end 13 of the shaft 11 in the space intersected by the axes of the angularly arranged shafts 11, 12. The clutch collar 21 is shiftable into and out of clutching engagement with internal teeth 22 in a recess in the gear 13 and is shifted in any suitable manner, as by a shift rod 23 having a fork 24 thereon working in a peripheral groove in the collar 21. The shift rod 23 extends through a wall of the casing and its outer end may be connected to a suitable remotely located shift lever within reach of the operator or driver of the vehicle in which the transmission mechanism is installed. The bearings for the shaft 11, in addition to the bearings 25 in an end wall of the box, also include a bearing 26 between the overload clutch and the gear 13. The inner end of the shaft 11 on which the clutch collar is mounted overhangs, and owing to the arrangement of the bearings 25 and 26 and the overload clutch, the drive shaft 11 is firmly mounted against developing looseness and misalignments and also the entire unit is compact in an axial direction, as well as sturdy in construction.

What we claim is:

1. A power take off unit for transmission mechanisms, the unit including a casing having drive and driven shafts journalled therein, the shafts being arranged at an angle to each other, intermeshing gears on said shafts, the gear on one shaft being rotatably mounted thereon and clutchable thereto, a manually operable clutch mounted on the said one shaft and shiftable to clutch and unclutch the gear thereon and said one shaft, a drive gear for the drive shaft and for meshing with a gear on the output shaft of the transmission mechanism, and an overload release coupling between the drive shaft and the drive gear, the manually operable clutch being located in the space at the intersection of the axes of the drive and driven shafts.

2. A power take off unit for transmission mechanisms, the unit including a casing having drive and driven shafts journalled therein and arranged at an angle to each other, the drive shaft extending across the end of the driven shaft and intermeshing gears mounted on the adjacent ends of the drive and driven shafts, a manually operable clutch mounted on the end of the drive shaft in the space intersected by the axes of the drive and driven shafts and operable to clutch the gear on the drive shaft to the drive shaft and unclutch the same therefrom, a drive gear for the drive shaft for meshing with a gear on the output shaft of the transmission mechanism and an overload release coupling between the drive shaft and the drive gear, the casing having bearings for the drive shaft, one being between the overload release coupling and the gear rotatably mounted on the drive shaft and clutchable thereto.

CARL D. PETERSON.
ALBERT H. DEIMEL.
CARL H. WOLCOTT.

REFERENCES CITED

The following references are of record in the file of this patent:

UNITED STATES PATENTS

| Number | Name | Date |
|---|---|---|
| 1,449,572 | Zuhars et al. | Mar. 27, 1923 |
| 1,476,886 | Haubert | Dec. 11, 1923 |
| 1,786,067 | Horste | Dec. 23, 1930 |
| 1,876,561 | Brown | Sept. 13, 1932 |
| 2,164,870 | DeSalardi | July 4, 1939 |
| 2,287,279 | Stumpf | June 23, 1942 |

FOREIGN PATENTS

| Number | Country | Date |
|---|---|---|
| 464,848 | Germany | Aug. 28, 1928 |